(12) United States Patent
Lischka et al.

(10) Patent No.: US 7,807,723 B1
(45) Date of Patent: Oct. 5, 2010

(54) WATER-FREE METALOXIDE COLLOIDS AND METAL OXIDE POLYMERS, METHOD FOR THE PRODUCTION THEREOF AND USE THEREOF

(75) Inventors: Uwe Lischka, Frankfurt am Main (DE); Jens Röder, Frankfurt am Main (DE); Ulrich Wietelmann, Friedrichsdorf (DE)

(73) Assignee: Chemetall GmbH, Frankfurt am Main (DE)

( * ) Notice: Subject to any disclaimer, the term of this patent is extended or adjusted under 35 U.S.C. 154(b) by 409 days.

(21) Appl. No.: 11/792,873

(22) PCT Filed: Dec. 12, 2005

(86) PCT No.: PCT/EP2005/013287

§ 371 (c)(1),
(2), (4) Date: Sep. 11, 2007

(87) PCT Pub. No.: WO2006/063757

PCT Pub. Date: Jun. 22, 2006

(30) Foreign Application Priority Data

Dec. 14, 2004 (DE) .................. 10 2004 060 427

(51) Int. Cl.
*C09K 3/00* (2006.01)
(52) U.S. Cl. ...................................................... 516/33
(58) Field of Classification Search .................... 516/33
See application file for complete search history.

(56) References Cited

U.S. PATENT DOCUMENTS 5,486,354 A * 1/1996 Defossez et al. .............. 424/63
2002/0141957 A1 * 10/2002 Tan et al. ...................... 424/63

FOREIGN PATENT DOCUMENTS

FR 2 691 380 A1 11/1993

OTHER PUBLICATIONS

Haeberle, "Zur Herstellung Hochreiner Jodide Der Lanthaniden", Technisch-Wissenschaftliche Abhandlungen Der Osram-Gesellschaft, (1973).
Taylor, "Preparation of Anhydrous Lanthanon Halides", Chem. Reviews, Amer. Chem. Soc. (1962).
Burgess, et al. "Lanthanide, Yttrium, and Scandium Trihalides: Preparation of Anhydrous Materials and Solution Thermochemistry", Advances in Inorganic Chemistry and Radiochemistry, Aca. Press (1981).

* cited by examiner

*Primary Examiner*—Ling-Siu Choi
*Assistant Examiner*—Chun-Cheng Wang
(74) *Attorney, Agent, or Firm*—Fulbright & Jaworski L.L.P.

(57) ABSTRACT

Water-free metal oxide colloids or metal oxide polymers of the formula $[M(O)X^3X^4]n$ (1) in an aprotic, organic solvent or solvent mixture, wherein M is Si, Ge, Sn, Ti, Zr or Hf; and $X^3$ and $X^4$ are independently $O_{1/2}$, H, alkoxy (—OR), wherein R represents an organo radical having 1-20 C-atoms, alkyl having 1-20 C atoms or aryl having 6-C atoms, wherein the alkyl- or aryl radicals an include one or several other halogen substituents, selected from the group of F, Cl, Br or I; and n is from 10-1.000.000.

20 Claims, No Drawings

WATER-FREE METALOXIDE COLLOIDS AND METAL OXIDE POLYMERS, METHOD FOR THE PRODUCTION THEREOF AND USE THEREOF

This is a §371 of PCT/EP2005/013287 filed Dec. 12, 2005, which claims priority from German Patent Application No. 10 2004 060 427.4 filed Dec. 14, 2004.

The invention relates to anhydrous metal oxide sols, or metal oxide colloids, and metal oxide polymers, as well as to processes for their preparation and to the use thereof.

Sols are colloidal solutions in which a solid or liquid substance is dispersed in very fine distribution, for example in a liquid medium. Depending on the nature of the liquid medium, a distinction is made between organosols (that is, suspensions in an organic solvent) and hydrosols (that is, aqueous suspensions, e.g. silica sol). By coagulation (flocculation), the sols change into so-called gels, which generally manifests itself externally by a reduction in flowability, that is to say solidification or coacervation.

Insoluble metal oxides, such as, for example, $SiO_2$, can be dissolved in water by the addition of alkali oxides or hydroxides, so-called water glasses being formed. These viscous solutions can be converted in various ways into sols, gels or true suspensions (e.g. preparation of silicic acid). It is possible to prepare therefrom so-called silica gels, which can be used for drying gases and organic liquids, as stationary phase for chromatography, as binders in paints or, for example, for surface treatment (e.g. building protective agents).

Silicones (polyorganosiloxanes) are compounds in which silicon atoms are bridged via oxygen atoms, but each Si atom carries one or more organic groups. These oligomers or polymers are generally prepared from halosilanes by hydrolysis or alcoholysis and subsequent polycondensation, e.g.

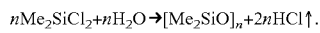

$n Me_2SiCl_2 + n H_2O \rightarrow [Me_2SiO]_n + 2n HCl\uparrow$.

The polycondensation is carried out in the presence of acidic catalysts and requires removal of the water of reaction that forms. When sufficiently high molar masses are achieved, silicone polymers having rubber-like properties are formed (H. H. Moretto, M. Schulze, G. Wagner, in: *Ullmann's Encyclopedia of Industrial Chemistry*, Vol. A24, 57-93, 1993).

A disadvantage of all the above-described processes and syntheses is the fact that the dispersions, oligomers and polymers are prepared either in water or a protic solvent and/or that water or a similar proton-active substance (e.g. an alcohol) is freed during the preparation, which makes the use of water-sensitive structural groups difficult or impossible.

As substrates for heterogeneous (that is to say solids-supported) catalysts there is frequently used a $SiO_2$-containing solid. For example, a catalyst support suitable for Ziegler's polyolefin preparation, consisting of $SiO_2/MgCl_2$, is prepared as follows:

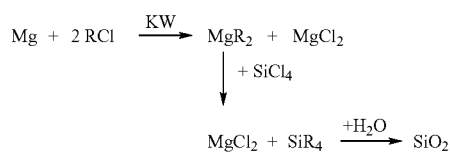

This is a complicated process comprising many steps, which has the disadvantage, inter alia, that the synthesis of the dialkylmagnesium compounds in hydrocarbons yields $MgCl_2$ waste which must be disposed of expensively; moreover, dialkylmagnesium compounds require extremely careful handling, because they can ignite automatically if air is admitted.

The object of the present invention is to overcome the disadvantages of the prior art and provide anhydrous metal oxide colloids or metal oxide polymers and synthesis routes therefor. In particular, the use or formation of proton-active substances, such as water or alcohols, and the use of substances that are difficult to handle, in particular self-igniting substances, are to be avoided.

The object is achieved by anhydrous metal oxide colloids and/or metal oxide polymers of the general formula $$[M(O)X^3X^4]_n \qquad (1)$$

in an aprotic organic solvent or solvent mixture, wherein M is Si, Ge, Sn, Ti, Zr or Hf; and $X^3$ and $X^4$, independently of one another, are $O_{1/2}$, H, alkoxy (—OR), wherein R represents an organo radical having from 1 to 20 carbon atoms, alkyl having from 1 to 20 carbon atoms or aryl having from 6 to 20 carbon atoms, wherein the alkyl or aryl radicals may carry one or more further halogen substituents selected from the group F, Cl, Br and I; and n assumes typical values of from 10 to 1,000,000.

The metal oxide colloids and/or metal oxide polymers can contain metal halides $M'Hal_x$, wherein M' is a metal selected from the group rare earth metals, Mn, Zn, Fe, Mg, Ca, Ba, Sr, Hal is halogen selected from the group Cl, Br, I, and x is the valence of the metal M'. Preferably, the molar concentration of the metal halide $M'Hal_x$ is from 0.1 to 200%, particularly preferably from 0.001 to 20%, of that of the metal oxide colloid, or metal oxide polymer, $MOX^3X^4$.

In a preferred embodiment, the metal oxide colloids and/or metal oxide polymers contain $MO_2$, wherein M=Si or Ti.

In another preferred embodiment, the metal oxide colloids and/or metal oxide polymers contain one or more of the following compounds: $C_6H_5SiO_{1.5}$, $HSiO_{1.5}$, $HalC_6H_4SiO_{1.5}$ (Hal=Cl, Br, I), $(H_3C)_2SiO$; $C_6H_5TiO_{1.5}$, $HTiO_{1.5}$, $HalC_6H_4TiO_{1.5}$ (Hal=Cl, Br, I), $(H_3C)_2TiO$.

The metal oxide colloids and/or metal oxide polymers preferably contain one or more of the following polar aprotic solvents: ethers (either open-chained or cyclic, mono- or poly-functional), esters (either carboxylic acid esters or carbonic acid esters), ketones, amides, nitriles, halogen-free sulfur compounds or tertiary amines. Particular preference is given to the following solvents: THF, 2-MeTHF, dimethyl carbonate, acetone, propionone, propylene carbonate and diethyl ether.

Preferably, the concentration of metal oxide colloid and/or metal oxide polymer is from 0.001 to 2 mol/l, particularly preferably from 0.01 to 1 mol/l.

The metal oxide colloids, or metal oxide polymers, according to the invention can be prepared by a process in which metal halogen compounds of the general formula $$MHal^1Hal^2X^1X^2 \qquad (2)$$

wherein
M=Si, Ge, Sn, Ti, Zr, Hf
Hal=Cl, Br, I
X1, X2=independently of one another Cl, Br, I, H, alkoxy (—OR), wherein R represents an organo radical having from 1 to 20 carbon atoms, alkyl having from 1 to 20 carbon atoms or aryl having from 6 to 20 carbon atoms, wherein the alkyl or aryl radicals may carry one or more further halogen substituents selected from the group F, Cl, Br and I, are reacted in a polar aprotic solvent with halogen acceptors selected from the group rare earth metal oxides, metal(II) oxides (e.g. MgO, CaO, BaO, SrO, ZnO, MnO) and $Fe_2O_3$.

M in this formula is always tetravalent.

Preferred metal halogen compounds are the tetrahalogen compounds $MHal_4$ (for meanings of M and Hal see above); $C_6H_5MHal_3$; $HMHal_3$; $C_6H_4HalMHal_3$ wherein $C_6H_4Hal$=e.g. chloro-, bromo- or iodo-phenyl; or mixtures thereof. Particularly preferred metal halogen compounds are: $SiCl_4$, $SiBr_4$, $GeCl_4$, $SnCl_4$, $TiCl_4$, $TiBr_4$, $C_6H_5SiCl_3$, $4\text{-}ClC_6H_4SiCl_3$, $4\text{-}BrC_6H_4SiCl_3$, $HSiCl_3$ and $(CH_3)_2SiCl_2$.

As rare earth metal oxides (halogen acceptors) there are used the compounds $SE_2O_3$ wherein SE=scandium, yttrium, La, Pr, Nd, Pm, Sm, Eu, Gd, Tb, Dy, Ho, Er, Tm, Yb or Lu, generally in commercially available form. Preference is given to the use of $Nd_2O_3$, $Sm_2O_3$ or $La_2O_3$.

As metal(II) oxides (halogen acceptors) there may preferably be used MgO, ZnO or MnO.

The halogen acceptors are preferably used in powdered and anhydrous form, that is to say with $H_2O$ contents <0.5%.

As polar aprotic solvents there may be used ethereal compounds. These may be open-chained, such as $R^1$—O—$R^2$ (wherein $R^1$ and $R^2$, independently of one another, are alkyl or aryl having from 1 to 8 carbon atoms); or cyclic, such as

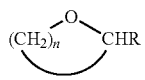

(wherein n=3 or 4 and R=H or alkyl having from 1 to 8 carbon atoms); or polyfunctional, such as R—O—(—$CH_2$—$CH_2$—O)$_n$—R' (wherein R and R', independently of one another, are alkyl radicals having from 1 to 8 carbon atoms and n=from 1 to 100)

and may be used either in pure form or in a mixture. As ethereal solvent there may be used, for example, tetrahydrofuran, tetrahydropyran, 2-methyltetrahydrofuran, dimethyl ether, diethyl ether or methyl tert-butyl ether or a mixture thereof.

The following aprotic polar solvents can further be used:

esters, for example carboxylic acid esters (such as ethyl acetate, γ-butyrolactone, methyl benzoate) or carbonic acid esters (such as dimethyl carbonate, diethyl carbonate, propylene carbonate, ethylene carbonate) or mixtures thereof; or ketones (e.g. acetone, propionone); or amides (e.g. N-methylpyrrolidone, dimethylacetamide, NMPU); or nitriles (e.g. acetonitrile, butyronitrile); or halogen-free sulfur compounds (e.g. dimethylsulfoxide); or tertiary amines (e.g. triethylamine, tetramethylethylenediamine).

There may optionally be added to the polar aprotic solvents one or more hydrocarbons, such as, for example, alkanes (e.g. pentane, hexane, cyclohexane, methylcyclohexane, heptane or octane) or aromatic compounds (e.g. benzene, toluene, ethylbenzene, cumene or xylene), in the weight ratio solvent: hydrocarbon=1: not more than 5.

It has been found, surprisingly, that the above-mentioned rare earth metal oxides, metal(II) oxides and $Fe_2O_3$, in the form of a suspension in polar aprotic solvents, react with the metal halogen compounds of formula (2) at temperatures of only, for example, ≦30° C., as follows:

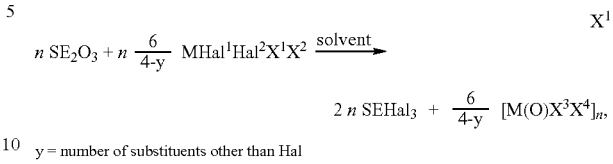

y = number of substituents other than Hal $X^2$, independently of one another, are: Cl, Br, I, H; alkoxy (—OR), wherein R represents an organo radical having from 1 to 20 carbon atoms; alkyl having from 1 to 20 carbon atoms or aryl having from 6 to 20 carbon atoms, wherein the alkyl or aryl radicals may contain one or more further halogen substituents selected from the group F, Cl, Br and I. y indicates the number of substituents X that are not halogen and may have the values 0, 1 or 2. If none of the substituents $X^1$, $X^2$ is a halogen, then y is 2; if all the substituents $X^1$, $X^2$ are a halogen, then y is 0.

In the reaction product $[M(O)X^3X^4]_n$, radicals $X^3$ and $X^4$ have the following meanings:

Where $X^1$ and/or $X^2$ had the meaning halogen (Cl, Br, I) in the metal halogen compound $MHal^1Hal^2X^1X^2$, $X^3$ and $X^4$ in the product $[M(O)X^3X^4]_n$, have the meaning $(O)_{1/2}$. Where $X^1$ and/or $X^2$ did not have the meaning halogen in the metal halogen compound $MHal^1Hal^2X^1X^2$ ($X^1$, $X^2$≠ Hal, but $X^1$ and/or $X^2$ are e.g. alkyl or aryl), $X^3$ and $X^4$ in the product $[M(O)X^3X^4]_n$, have the same, unchanged meaning as in the metal halogen compound.

For the purposes of clarification, the stoichiometries in the case of three selected raw material combinations are shown:

a) $X^1$ and $X^2$ = Hal

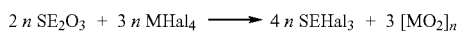

b) $X^1$ = $C_6H_5$, $X^2$ = Hal

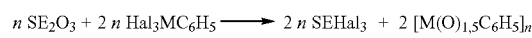

c) $X^1$, $X^2$ = $CH_3$

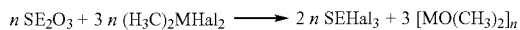

The simple method of forming the metal oxides according to a) is surprising for the person skilled in the art because the reverse reaction in the absence of the solvents used according to the invention is known in the literature. For example, in Gmelin's Handbook of Inorg. Chem., 8$^{th}$ ed., Sc, Y, La—Lu, Part C4a, p. 152, it is described that quartz (that is to say pure $SiO_2$) and silicate glasses reacted with liquid and solid rare earth chlorides at elevated temperatures according to the equation

Furthermore, a plurality of oxide silicates and chlorosilicates (e.g. $Yb_3(SiO_4)_2Cl$) could form.

In contrast thereto it has been found here that silicon tetrachloride reacts rapidly and irreversibly with rare earth oxides even at room temperature in, for example, tetrahydrofuran (THF) as solvent to form the desired metal oxides:

$$2\ SE_2O_3 + 3\ SiCl_4 \xrightarrow{THF} 4\ (SECl_3)_{THF} + 3\ SiO_2$$

It is also particularly surprising that the metal oxide that forms, e.g. $SiO_2$, is first obtained in soluble form, presumably as a metastably soluble polymer sol. The rare earth halides, on the other hand, generally possess only low solubility in the solvents or solvent mixtures according to the invention, as a result of which the rare earth halide can be separated from the metal oxide sol in solid form, mostly in the form of a solvate with the aprotic polar solvent used, by solid/liquid separation.

For example, the reaction of $Nd_2O_3$ with $SiCl_4$ in THF yields a $NdCl_3 \cdot 2$ THF complex which is only slightly soluble in THF (about 1 to 1.5%, based on $NdCl_3$) and can be separated from the desired $SiO_2$ sol in crystalline form by filtration.

It is frequently observed that the metal oxide is dissolved in the form of a sol for only a particular time (from hours to several days) and then changes to the gel form. Because simple separation of the solid rare earth halide (e.g. by filtration, decantation or centrifugation) is then no longer possible, a preferred embodiment of the present invention consists in carrying out the solid/liquid separation before conversion to the gel state.

Instead of oxides of trivalent metals (rare earth oxides and iron oxide), it is also possible to use other metal oxides for the oxidation of the metal halide compounds. For example, some oxides with metals in the divalent oxidation state M'O, where M'=Mg, Ca, Ba, Sr, Mn, Zn, are able to oxidise the metal halogen compounds according to the following equation:

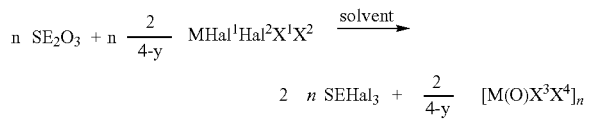

$$n\ SE_2O_3 + n\ \frac{2}{4-y}\ MHal^1Hal^2X^1X^2 \xrightarrow{solvent} 2\ n\ SEHal_3 + \frac{2}{4-y}\ [M(O)X^3X^4]_n$$

y = number of substituents other than Hal $X^1$, $X^2$, independently of one another, are: Cl, Br, I, H; alkoxy (—OR), wherein R represents an organo radical having from 1 to 20 carbon atoms; alkyl having from 1 to 20 carbon atoms or aryl having from 6 to 20 carbon atoms, wherein the alkyl or aryl radicals may contain one or more further halogen substituents selected from the group F, Cl, Br and I. y indicates the number of substituents X that are not halogen and can have the values 0, 1 or 2. If none of the substituents $X^1$, $X^2$ is a halogen, then y is 2; if all of the substituents $X^1$, $X^2$ are a halogen, then y is 0.

The meaning of the radicals $X^3$ and $X^4$ in the product $[M(O)X^3X^4]_n$ is $(O)_{1/2}$ where $X^1$ and/or $X^2$ had the meaning halogen (Cl, Br, I) in the metal halogen compound $MHal^1Hal^2X^1X^2$, or is the same as in the metal halogen compound where $X^1$, $X^2 \neq$ Hal. For the purposes of clarification, the stoichiometries in the case of three selected raw material combinations are shown:

a) $X^1$ and $X^2$ = Hal

$$2n\ M'O + n\ MHal_4 \longrightarrow 2n\ M'Hal_2 + [MO_2]_n$$

b) $X^1 = C_6H_5$, $X^2$ = Hal

$$3n\ M'O + 2n\ Hal_3MC_6H_5 \longrightarrow 3n\ M'Hal_2 + 2\ [M(O)_{1.5}C_6H_5]_n$$

c) $X^1$, $X^2 = CH_3$

$$n\ M'O + 2n\ (H_3C)_2MHal_2 \longrightarrow n\ M'Hal_2 + 2\ [MO(CH_3)_2]_n.$$

Expediently, the theoretical reaction ratios are largely maintained. Depending on the intended application, it is also possible to deviate upwards or downwards from the indicated general stoichiometries, for example preferably up to 50%. In these cases, either unreacted halogen acceptor (halogen acceptor in excess) is left over, which is generally insoluble and therefore can readily be removed by filtration; or unchanged metal halogen compound is left over (metal halogen compound in excess), which is generally soluble and therefore remains as a homogeneous impurity in the metal colloid phase. The latter is generally disadvantageous if a metal oxide polymer or metal oxide colloid having as high a purity as possible is desired.

The metal oxide colloids and/or metal oxide polymers according to the invention are used, for example, in the surface treatment of solids, that is to say for coating materials of all types, in particular metals, ceramics, glass, plastics, electroactive materials or the like, with a $MOX^3X^4$ layer that has optionally been doped with the metal cation introduced by the halogen acceptor, or in the preparation of heterogeneous catalysts ($MOX^3X^4$-containing solids) by direct concentration of the metal colloid by evaporation or precipitation/drying of the metal colloid. Such catalysts are used for polymer synthesis, for example for the production of polyolefins such as polyethylene, polypropylene or mixed polymers and copolymers or polyesters such as polyethylene terephthalate (PET), polyethylene naphthenate (PEN), polybutylene terephthalate (PBT).

The colloid solutions can further be used as gelling agents for organic or inorganic preparations. After removal of the solvent, and depending on the state of aggregation of the $MOX^3X^4$ product that remains, the following possible uses also exist:

as a heat transfer oil, lubricant or antifoam (applies to oily products), wherein M is preferably Si, or as working material (applies to rubber-elastic or resinous products).

The subject-matter of the invention is explained in greater detail by means of the following Examples:

EXAMPLE 1

Preparation of $SiO_2$ sol from $SiCl_4/Nd_2O_3$ in THF

In a 0.5-liter double-walled reactor which was equipped with a reflux condenser and a dropping funnel and had been rendered inert, that is to say dried and filled with argon, 25.2 g (75 mmol) of neodymium oxide (99% from Aldrich) were suspended in 140 g of THF. In the course of 30 minutes, with stirring, 20.5 g (120 mmol) of silicon tetrachloride were metered in at internal temperatures of from 25 to 30° C.

The reaction was markedly exothermic, and a pale blue suspension formed. When the dropwise addition was complete, stirring was continued for a further 1.5 hours at about 30° C., followed by cooling to 20° C.

The suspension was then discharged onto a G3 glass frit, and the crystalline filtration residue was washed once with 48 g of THF. The residue was vacuum-dried at 25° C. and identified as NdCl$_3$.2 THF (50.8 g, 90% of theory). Filtrate and washing filtrate were combined.

Weighed substance: 123 g, clear, almost colourless
Analysis (mmol/g):
Si=0.89; Nd=0.11; Cl=0.35

Based on silicon, this corresponds to a yield of 91%. Small amounts of the secondary product NdCl$_3$ were dissolved in the product solution.

In the $^{29}$Si—NMR spectrum, a broad signal was recorded at δ=112.8 ppm (for comparison: SiCl$_4$ has a shift of δ=−18.5 ppm). No significant amounts of volatile secondary products were detectable by gas chromatography (THF=99.8% by surface area).

The solution, which was at first readily mobile, solidified after about 2 days' storage at room temperature to form a solid gel.

EXAMPLE 2

Preparation of TiO$_2$ sol from TiCl$_4$/Nd$_2$O$_3$ in THF

In a 250-ml three-necked flask which had been rendered inert, 12.4 g (37.2 mmol) of neodymium oxide were suspended in 76 g of THF and cooled to 0° C. by means of an ice-bath. Then, in the course of half an hour, 11.4 g (61 mmol) of TiCl$_4$ were added by means of injection, with thorough stirring (very violent exothermic reaction).

Stirring was continued for a further 20 minutes at 0° C. and then for 2 hours at room temperature, followed by filtration. The filtration residue was washed with 20 ml of THF. There were obtained 16.7 g of a blue-grey crystallisate, which was identified as NdCl3.2 THF complex.

The yellowish-greenish filtrate (83 g) was analysed as follows:
Ti=0.62 mmol/g Nd=0.061 mmol/g Cl=0.25 mmol/g This corresponds to a yield, based on titanium, of 84%. The TiO$_2$ sol is doped with NdCl$_3$, which has a solubility of about 1.5 wt. % in the system.

No significant amounts of volatile secondary products, in particular no components indicating decomposition of THF, such as, for example, butanol, were detectable by gas chromatography.

Further examples according to the invention are to be found in the following table:

EXAMPLES 3 TO 13

TABLE 1

Preparation of metal oxide sols

| Ex. No. | Metal oxide Type | Amount (mmol) | Metal halogen compound Type | Amount (g) | Solvent Type | Amount (g) | Reaction conditions |
|---|---|---|---|---|---|---|---|
| 3 | Nd$_2$O$_3$ | 50 | PhSiCl$_3$ | 100 | THF | 92 | 1 hour 30° C., then 2 h refluxing |
| 4 | La$_2$O$_3$ | 100 | SiCl$_4$ | 158 | THF | 248 | stirring 25° C., then 3 h refluxing |
| 5 | La$_2$O$_3$ | 50 | SiCl$_4$ | 78.9 | THF/toulene | 160 | 4 h 25-35° C. |
| 6 | La$_2$O$_3$ | 50 | SiCl$_4$ | 78.5 | DMC | 171 | 1 h about 25° C., then 1.5 h refluxing |
| 7 | Sm$_2$O$_3$ | 19.4 | SiCl$_4$ | 29.4 | THF | 90 | 3 h refluxing |
| 8 | ZnO | 50 | SiCl$_4$ | 25 | THF | 31 | 1 h 20-50° C. |
| 9 | MnO | 79 | SiCl$_4$ | 44 | THF | 90 | 2 h 25-40° C. |
| 10 | MgO | 28 | SiCl$_4$ | 18 | Et$_2$O | 105 | 1 h 20-30° C., 2 h refluxing |
| 11 | MgO | 50 | SiCl$_4$ | 25 | THF | 27 | 1 h 30-65° C. |
| 12 | MgO | 157 | PhSiCl$_3$ | 100 | THF | 191 | 1 h 20-30° C., 1 h refluxing |
| 13 | La$_2$O$_3$ | 30 | SiBr$_4$ | 45 | 2-MeTHF | 140 | 1 h refluxing |

TABLE 2

Test results of the metal oxide sol preparation

| Ex. No. | Solution Appearance | Amount (g) | Analysis (mmol/g) Metal | Si | Halide | Composition Metal oxide colloid (wt. %) | Metal halide (wt. %) | Observations |
|---|---|---|---|---|---|---|---|---|
| 3 | yellowish-greenish | 149[1)] | 0.05 (Nd) | 0.63 | 0.18 (Cl) | SiPhO$_{1.5}$ (8.2) | NdCl$_3$ (1.3) | |

TABLE 2-continued

Test results of the metal oxide sol preparation

| | Solution | | Analysis (mmol/g) | | | Composition | | |
|---|---|---|---|---|---|---|---|---|
| | | Amount | | | | Metal oxide colloid | Metal halide | |
| Ex. No. | Appearance | (g) | Metal | Si | Halide | (wt. %) | (wt. %) | Observations |
| 4 | yellow, clear | 370[1)] | 0.005 (La) | 0.31 | 0.18 (Cl) | $SiO_2$ (1.9) | $LaCl_3$ (0.1) | gel formation during storage |
| 5 | yellowish | 260 | 0.07 (La) | 0.25 | 0.30 (Cl) | $SiO_2$ (1.5) | $LaCl_3$ (0.15) | |
| 6 | colourless, clear | 79 | n.d. | 0.34 | 0.04 (Cl) | $SiO_2$ 2.0 | ./. | gelling after about 2 weeks |
| 7 | pale yellow, slightly cloudy | 147 | 0.06 (Sm) | 0.10 | 0.26 (Cl) | $SiO_2$ (0.6) | $LaCl_3$ (1.5) | gel formation |
| 8 | colourless, clear | 25 | 0.75 (Zn) | 0.85 | 1.73 (Cl) | $SiO_2$ (4.9) | $ZnCl_2$ (10) | |
| 9 | pale brownish, clear | 111 | 0.005 (Mn) | 0.44 | 0.12 (Cl) | $SiO_2$ (2.5) | $MnCl_2$ (0.1) | |
| 10 | colourless, slighly cloudy | 163 | 0.03 (Mg) | 0.07 | 0.07 (Cl) | $SiO_2$ (0.4) | $MgCl_2$ (0.3) | |
| 11 | colourless, clear | 23 | 0.65 (Mg) | 0.27 | 1.35 (Cl) | $SiO_2$ (1.5) | $MgCl_2$ (6.2) | |
| 12 | yellowish-green/clear | 220[1)] | 0.50 (Mg) | 0.45 | 0.95 (Cl) | $SiPhO_{1.5}$ (6.0) | $MgCl_2$ (4.8) | post-precipitations |
| 13 | colourless | 144[1)] | 0.21 (La) | 0.19 | 0.65 (Br) | $SiO_2$ (1.1) | $LaBr_3$ (8.0) | |

[1)]incl. amount of washing solvent
n.d. = not detectable

In contrast to Example 1, an organosilane (phenyltrichlorosilane) was used as halogenating agent in Example 3 instead of $SiCl_4$. After filtration, there was obtained a clear, readily mobile solution which contained an Si polymer of the general formula $[SiPhO_{1.5}]_n$. The product solution did not change, that is to say no gel formation occurred, even on prolonged storage.

In Examples 4 and 7, other rare earth oxides ($La_2O_3$, $Sm_2O_3$) were used instead of $Nd_2O_3$. In both cases, the filtrates changed to the gel state, with solidification, after a few days. If a mixture of THF/toluene is used as reaction solvent instead of pure THF, no gelling was observed in the case of the raw material combination chosen in Example 5.

When dimethyl carbonate (DMC) was used, on the other hand, gelling occurred after a relatively prolonged standing time (Example 7).

Examples 8 to 12 are concerned with halogen acceptors other than rare earth metal oxides: zinc oxide (Example 8), manganese oxide (Example 9), magnesium oxide (Examples 10 to 12). Finally, Example 13 shows that bromine compounds, in this case silicon tetrabromide, can also be used instead of chlorine-based metal halogen compounds.

The invention claimed is:

1. An anhydrous metal oxide colloid or metal oxide polymer of the formula $[M(O)X^3X^4]_n$ (1) in an aprotic organic solvent or solvent mixture, wherein M is Si, Ge, Sn, Ti, Zr or Hf; and $X^3$ and $X^4$ are independently $O_{1/2}$, H or alkoxy (—OR), wherein R is an organo radical having from 1 to 20 carbon atoms, alkyl having from 1 to 20 carbon atoms or aryl having from 6 to 20 carbon atoms, wherein the alkyl or aryl may be substituted at least once by a halogen substituents selected from the group consisting of F, Cl, Br and I; and n is from 10 to 1,000,000, wherein the metal oxide colloids and/or metal oxide polymers contain metal halides $M'Hal_x$, wherein M' is a metal selected from the group consisting of rare earth metals, Mn, Zn, Fe, Mg, Ca, Ba, and Sr; Hal is halogen selected from the group consisting of Cl, Br, and I; and x is the valence of the metal M'.

2. The metal oxide colloid or metal oxide polymer according to claim 1, wherein the molar concentration of the metal halide $M'Hal_x$ is from 0.1 to 200% of that of the metal oxide colloid $MOX^3X^4$.

3. An anhydrous metal oxide colloid or metal oxide polymer of the formula $[M(O)X^3X^4]_n$ (1) in an aprotic organic solvent or solvent mixture, wherein M is Si, Ge, Sn, Ti, Zr or Hf; and $X^3$ and $X^4$ are independently $O_{1/2}$, H or alkoxy (—OR), wherein R is an organo radical having from 1 to 20 carbon atoms, alkyl having from 1 to 20 carbon atoms or aryl having from 6 to 20 carbon atoms, wherein the alkyl or aryl may be substituted at least once by a halogen substituents selected from the group consisting of F, Cl, Br and I; and n is from 10 to 1,000,000, wherein the metal oxide colloids and/or metal oxide polymers contain metal halides $M'Hal_x$, further comprising metal salts in concentrations of from 0.001 to 20 wt. %.

4. An anhydrous metal oxide colloid or metal oxide polymer of the formula $$[M(O)X^3X^4]_n \qquad (1)$$

in an aprotic organic solvent or solvent mixture,
wherein M is Si, Ge, Sn, Ti, Zr or Hf; and
$X^3$ and $X^4$ are independently $O_{1/2}$, H or alkoxy (—OR), wherein
R is an organo radical having from 1 to 20 carbon atoms, alkyl having from 1 to 20 carbon atoms or aryl having from 6 to 20 carbon atoms, wherein the alkyl or aryl radical may be substituted at least once by a halogen substituents selected from the group consisting of F, Cl, Br and I; and n is from 10 to 1,000,000, containing a compound of the following empirical formulae: $C_6H_5SiO_{1.5}$, $HSiO_{1.5}$, $HalC_6H_4SiO_{1.5}$, $(H_3C)_2SiO$; $C_6H_5TiO_{1.5}$, $HTiO_{1.5}$, $HalC_6H_4TiO_{1.5}$, or $(H_3C)_2TiO$, wherein Hal is Br, Cl or I.

5. An anhydrous metal oxide colloid or metal oxide polymer of the formula $$[M(O)X^3X^4]_n \qquad (1)$$

in an aprotic organic solvent or solvent mixture,
wherein M is Si, Ge, Sn, Ti, Zr or Hf; and
$X^3$ and $X^4$ are independently $O_{1/2}$, H or alkoxy (—OR), wherein
R is an organo radical having from 1 to 20 carbon atoms, alkyl having from 1 to 20 carbon atoms or aryl having from 6 to 20 carbon atoms, wherein the alkyl or aryl radical may be substituted at least once by a halogen substituents selected from the group consisting of F, Cl, Br and I; and n is from 10 to 1,000,000,
wherein the concentration of metal oxide colloid or metal oxide polymer is from 0.001 to 2 mol/l.

6. The metal oxide colloid or metal oxide polymer according to claim 5, wherein the concentration of metal oxide colloid or metal oxide polymer is from 0.01 to 1 mol/l.

7. A process for the preparation of an anhydrous metal oxide colloid or metal oxide polymer of claim 1 in an aprotic organic solvent or solvent mixture, in which metal halogen compounds of the general formula $MHal^1Hal^2X^1X^2$ (2), wherein M is Si, Ge, Sn, Ti, Zr, Hf; Hal is Cl, Br, I; $X^1$, $X^2$ are independently Cl, Br, I, H, or alkoxy (—OR), wherein R is an organo radical having from 1 to 20 carbon atoms, alkyl having from 1 to 20 carbon atoms or aryl having from 6 to 20 carbon atoms, wherein the alkyl or aryl radicals may carry one or more further halogen substituents selected from the group F, Cl, Br and I, are reacted in a polar aprotic solvent with halogen acceptors selected from the group consisting of rare earth metal oxides $SE_2O_3$, wherein SE is Sc, Y, La, Pr, Nd, Pm, Sm, Eu, Gd, Tb, Dy, Ho, Er, Tm, Yb or Lu; metal(II) oxides and $Fe_2O_3$.

8. A process according to claim 7, wherein the metal halogen compound is a tetrahalogen compound of formula $MHal_4$.

9. A process according to claim 7, wherein the metal halogen compound is selected from the group consisting of $C_6H_5MHal_3$, $HMHal_3$, $C_6H_4HalMHal_3$, $(H_3C)_2MClCH_2Hal$, $(CH_3)_2MHal_2$ and $(CH_3)_3MHal$.

10. A process according to claim 7, wherein the metal halogen compound is selected from the group consisting of $SiCl_4$, $SiBr_4$, $GeCl_4$, $SnCl_4$, $TiCl_4$, $TiBr_4$, $C_6H_5SiCl_3$, $4\text{-}ClC_6H_4SiCl_3$, $4\text{-}BrC_6H_4SiCl_3$, $HSiCl_3$ and $(CH_3)_2SiCl_2$.

11. A process according to claim 7, wherein the rare earth metal oxide is selected from the group consisting of $Nd_2O_3$, $SM_2O_3$ and $La_2O_3$.

12. A process according to claim 7, wherein the metal(II) oxide is selected from the group consisting of MgO, CaO, BaO, SrO, ZnO and MnO.

13. A process according to claim 7, wherein the halogen acceptor is in powdered form and had a water content of <0.5%.

14. A process according to claim 7, wherein the polar aprotic solvent is one or more ethereal compounds, wherein these compounds may be open-chained, such as $R^1$—O—$R^2$ (wherein $R^1$ and $R^2$, independently of one another, are alkyl or aryl having from 1 to 8 carbon atoms); or may be cyclic, such as, wherein n is 3 or 4 and R=H or alkyl having from 1 to 8 carbon atoms; or polyfunctional, such as R—O—(—$CH_2$—$CH_2$—O$)_n$—R', wherein R and R' are independently alkyl radicals having from 1 to 8 carbon atoms, and n is from 1 to 100.

15. A process according to claim 7, wherein the aprotic polar solvents comprises an ester, a ketone, a nitrile, a halogen-free sulfur compound or a tertiary amine.

16. A process according to claim 7, further comprising adding at least one hydrocarbon to the solvent, wherein the hydrocarbon is an alkane or an aromatic and is added in a weight ratio of solvent:hydrocarbon of from 1: not more than 5.

17. A process according to claim 16, wherein the hydrocarbon is selected form the group consisting of pentane, hexane, cyclohexane, methylcyclohexane, heptane, octane, benzene, toluene, ethylbenzene, cumene and xylene.

18. A method comprising treating a surface of a solid by applying the metal oxide colloid metal oxide polymer according to claim 1 to the surface.

19. The method according to claim 18, wherein a coating is formed on the surface, and the surface is a metal, a ceramic, a glass, a plastic or an electroactive material or the like.

20. The method of claim 19, wherein the coating is doped with the metal cation introduced by the halogen acceptor.

* * * * *